(12) United States Patent
Kim et al.

(10) Patent No.: US 11,936,792 B2
(45) Date of Patent: Mar. 19, 2024

(54) METHOD AND SYSTEM FOR PROVIDING PRIVACY-PRESERVING DATA ANALYSIS

(71) Applicant: COMMON COMPUTER INC., Seoul (KR)

(72) Inventors: Minhyun Kim, Seoul (KR); Dongil Seo, Seoul (KR); Sooyong Bang, Yongin-si (KR); Seonghwa Yun, Seongnam-si (KR); Youngseo Yoo, Seoul (KR); Sanghee Choi, Seongnam-si (KR); Minsu Lee, Seoul (KR); Yong Dae An, Seoul (KR); Seung Woo Jung, Seoul (KR); Jung Ho Moon, Seoul (KR)

(73) Assignees: Common Computer Inc, Seoul (KR); Desilo Inc, Seoul (KR)

( * ) Notice: Subject to any disclaimer, the term of this patent is extended or adjusted under 35 U.S.C. 154(b) by 335 days.

(21) Appl. No.: 17/535,960

(22) Filed: Nov. 26, 2021

(65) Prior Publication Data

US 2023/0147654 A1    May 11, 2023

(30) Foreign Application Priority Data

Nov. 9, 2021    (KR) .......................... 10-2021-0152749

(51) Int. Cl.
*H04L 9/32*    (2006.01)
*G06F 21/62*   (2013.01)
*H04L 9/00*    (2022.01)

(52) U.S. Cl.
CPC ........ *H04L 9/3236* (2013.01); *G06F 21/6227* (2013.01); *G06F 21/6245* (2013.01); *H04L 9/008* (2013.01); *H04L 9/50* (2022.05)

(58) Field of Classification Search
CPC ......... H04L 9/3236; H04L 9/008; H04L 9/50; G06F 21/6227; G06F 21/6245; G06F 21/62

See application file for complete search history.

(56) References Cited

U.S. PATENT DOCUMENTS

| | | | |
|---|---|---|---|
| 10,778,410 B2 * | 9/2020 | Han ......................... | H04L 9/30 |
| 11,822,679 B2 * | 11/2023 | Leal Monteiro ...... | H04L 63/145 |

(Continued)

FOREIGN PATENT DOCUMENTS

| | | |
|---|---|---|
| KR | 10-2019-0085674 A | 7/2019 |
| KR | 10-2019-0117286 A | 10/2019 |

*Primary Examiner* — Sargon N Nano
(74) *Attorney, Agent, or Firm* — Innovation Counsel LLP

(57) ABSTRACT

A computing method for privacy-preserving data analysis is provided, in which the computing method is performed by at least one processor and includes receiving a data analysis request including data-to-be-analyzed from a client, homomorphically encrypting the data-to-be-analyzed using an encryption engine, and uploading the homomorphically encrypted data-to-be-analyzed to a target path of a blockchain, and then, the method includes, based on the request to check analysis result, decrypting an analysis result of the homomorphically encrypted data stored in a designated path of the blockchain by using the encryption engine, and providing the decrypted analysis result to the client, in which the analysis result of the homomorphically encrypted data is data analyzed by a worker linked to the blockchain, and stored in a designated path in association with the target path of the blockchain.

10 Claims, 11 Drawing Sheets

(56) References Cited

U.S. PATENT DOCUMENTS

| | | | |
|---|---|---|---|
| 2019/0075020 A1* | 3/2019 | Leal Monteiro | G06F 21/32 |
| 2019/0207813 A1* | 7/2019 | Uehara | H04L 9/3239 |
| 2020/0051077 A1* | 2/2020 | Ma | G06Q 20/065 |
| 2020/0177366 A1* | 6/2020 | Han | H04L 9/3239 |
| 2020/0244634 A1* | 7/2020 | Benavides | G06F 16/903 |
| 2020/0374267 A1* | 11/2020 | Shepard | G06F 16/245 |
| 2021/0157934 A1* | 5/2021 | Leal Monteiro | G06F 21/55 |
| 2021/0374232 A1* | 12/2021 | Bursell | G06F 21/50 |
| 2022/0006629 A1* | 1/2022 | Williams | G06F 21/6245 |
| 2022/0385450 A1* | 12/2022 | Soon-Shiong | G06F 21/6245 |

* cited by examiner

METHOD AND SYSTEM FOR PROVIDING PRIVACY-PRESERVING DATA ANALYSIS

CROSS-REFERENCE TO RELATED APPLICATION

This application claims priority under 35 U.S.C § 119 to Korean Patent Application No. 10-2021-0152749 filed in the Korean Intellectual Property Office on Nov. 9, 2021, the entire contents of which are hereby incorporated by reference.

TECHNICAL FIELD

The present disclosure relates to a computing method and a system for privacy-preserving data analysis, and more specifically, to a computing method and a system for privacy-preserving data analysis, which are implemented such that data requiring privacy protection can be used on a blockchain network without a concern of data leakage.

BACKGROUND

The present disclosure relates to a computing method and a system for privacy-preserving data analysis, and more specifically, to a computing method and a system for privacy-preserving data analysis, which are implemented such that data requiring privacy protection can be used on a blockchain network without a concern of data leakage.

In general, blockchain technology refers to a technology that records and stores contents of transactions performed over a network communication in a reliable and secure way. A blockchain network is a system in a distributed environment in which the exchange of digitized assets or transactions are enabled, and, using a shared ledger, it records the history of electronic transactions or operations that occur in a peer-to-peer (P2P) network. Since the blockchain network uses a decentralized consensus mechanism, forgery and alteration of transactions by third parties is virtually practically impossible, and this ensures the reliability and transparency of transactions. Recently, use of blockchain technology is attempted in various service fields such as financial services, medical services such as healthcare, and the like.

Meanwhile, on the blockchain network, when an operation (e.g., data analysis) is performed on data (e.g., medical data, and the like) for which privacy protection is important, there may be a risk of leaking data in the process of transmitting data and receiving the result of the operation in distributed computing devices.

For example, for an operation on a blockchain network, although data x is encrypted e(x) and transmitted to a computing device, since the computing device works by decrypting (x) the encrypted data e(x) in order to work with the data, personal information may be leaked. In addition, when the data x is medical data, it is against the medical law to transmit medical data from the hospitals or the like to an external system. While it is allowed to transmit medical data in encrypted state, even in this case, violation of medical law may occur when the computing device decrypts the data and the medical data is exposed.

SUMMARY

In order to solve the problems described above, the present disclosure provides a computing method, computer program stored in a recording medium and apparatus (system) for privacy-preserving data analysis.

In addition, according to an embodiment, there is provided a computing method, computer program stored in a recording medium and apparatus (system) for privacy-preserving data analysis, which are capable of safe processing and management of data without concern of data leakage when performing blockchain-based analysis of data requiring privacy protection.

In addition, the problems to be solved by the present disclosure are not limited to the problems described above, and other problems may be present.

The present disclosure may be implemented in various ways including a computing method, a computing device (system), or a computer program stored in a readable storage medium for privacy-preserving data analysis.

According to an embodiment, a computing method for privacy-preserving data analysis performed by at least one processor may include receiving a data analysis request including data-to-be-analyzed from a client, homomorphically encrypting the data-to-be-analyzed by using an encryption engine, uploading the homomorphically encrypted data-to-be-analyzed to a target path of a blockchain, decrypting an analysis result of the homomorphically encrypted data stored in a designated path of the blockchain by using the encryption engine, and providing the decrypted analysis result to the client. In addition, the analysis result of the homomorphically encrypted data may be data analyzed by a worker linked to the blockchain, and stored in a designated path in association with the target path of the blockchain, and the designated path may indicate a path associated with the target path.

According to an embodiment, the data analysis request may include at least one of identification information associated with the client or information on an analysis target, and the target path of the blockchain may mean a path associated with at least one of the identification information or the information on the analysis target.

According to an embodiment, the computing method may include, in response to the uploading the homomorphically encrypted data-to-be-analyzed to the target path of the blockchain, transmitting a request for analysis operation to the worker associated with the target path.

According to an embodiment, the computing method may further include, in response to the storing of the analysis result of the homomorphically encrypted data-to-be-analyzed being in the designated path of the blockchain, transmitting an analysis operation completion notification to the client.

According to an embodiment, the decrypting the analysis result of the homomorphically encrypted data stored in the designated path of the blockchain by using the encryption engine may include receiving a request to check analysis result from the client, receiving the analysis result of the homomorphically encrypted data stored in the designated path of the blockchain, and decrypting the analysis result of the homomorphically encrypted data by using the encryption engine. In addition, the request to check analysis result may include identification information associated with the client, information on an analysis target, and information on at least one of the target path or the designated path.

According to an embodiment, the data-to-be-analyzed may include data extracted from a plurality of applications.

A computer program is provided, which is stored in a computer-readable recording medium for executing, on a computer, the computing method for privacy-preserving data analysis according to the present disclosure.

A computing system for privacy-preserving data analysis according to an embodiment may include a communication module; a memory; and at least one processor connected to the memory and configured to execute at least one computer-readable program included in the memory. In an example, the at least one program may further include instructions for receiving a data analysis request including data-to-be-analyzed from a client, homomorphically encrypting the data-to-be-analyzed using an encryption engine, uploading the homomorphically encrypted data-to-be-analyzed to a target path of a blockchain, decrypting an analysis result of the homomorphically encrypted data stored in a designated path of the blockchain by using the encryption engine, and providing decrypted analysis result to the client, in which the analysis result of the homomorphically encrypted data may be data analyzed by a worker linked to the blockchain, and stored in a designated path in association with the target path of the blockchain, and the designated path may correspond to a path associated with the target path.

According to an embodiment, the data analysis request may include at least one of identification information associated with the client or information on an analysis target, and the target path of the blockchain may mean a path associated with at least one of the identification information or the information on the analysis target.

According to an embodiment, the at least one program may further include instructions for, in response to the uploading the homomorphically encrypted data-to-be-analyzed to the target path of the blockchain, transmitting a request for analysis operation to the worker associated with the target path.

According to some embodiments of the present disclosure, data requiring privacy protection is homomorphically encrypted to be uploaded, analyzed, and stored, so that concerns of data leakage can be eliminated in the entire process of transmitting data-to-be-analyzed, analyzing the same, and transmitting analysis results.

According to some embodiments of the present disclosure, since it is not necessary for a distributed computing device such as a worker on a blockchain network to decrypt the homomorphically encrypted data to perform analysis operation, the privacy guarantee can still be maintained during the data analysis process. Accordingly, both data usability and security aspects can be satisfied.

According to some embodiments of the present disclosure, since the analysis result of the data is also maintained in the homomorphically encrypted state, and the homomorphically encrypted analysis result is decrypted only when there is a user request, personal information can be safely processed and managed from the request for data analysis to the storage of analysis result, enabling a wide range of applications in various industries requiring high privacy preservation.

The effects of the present disclosure are not limited to the effects described above, and other effects not described can be clearly understood by those of ordinary skill in the art (referred to as "ordinary technician") from the description of the claims.

BRIEF DESCRIPTION OF THE DRAWINGS

Embodiments of the present disclosure will be described with reference to the accompanying drawings described below, where similar reference numerals indicate similar elements, but embodiments are not limited thereto, in which.

DETAILED DESCRIPTION

Figure 1:
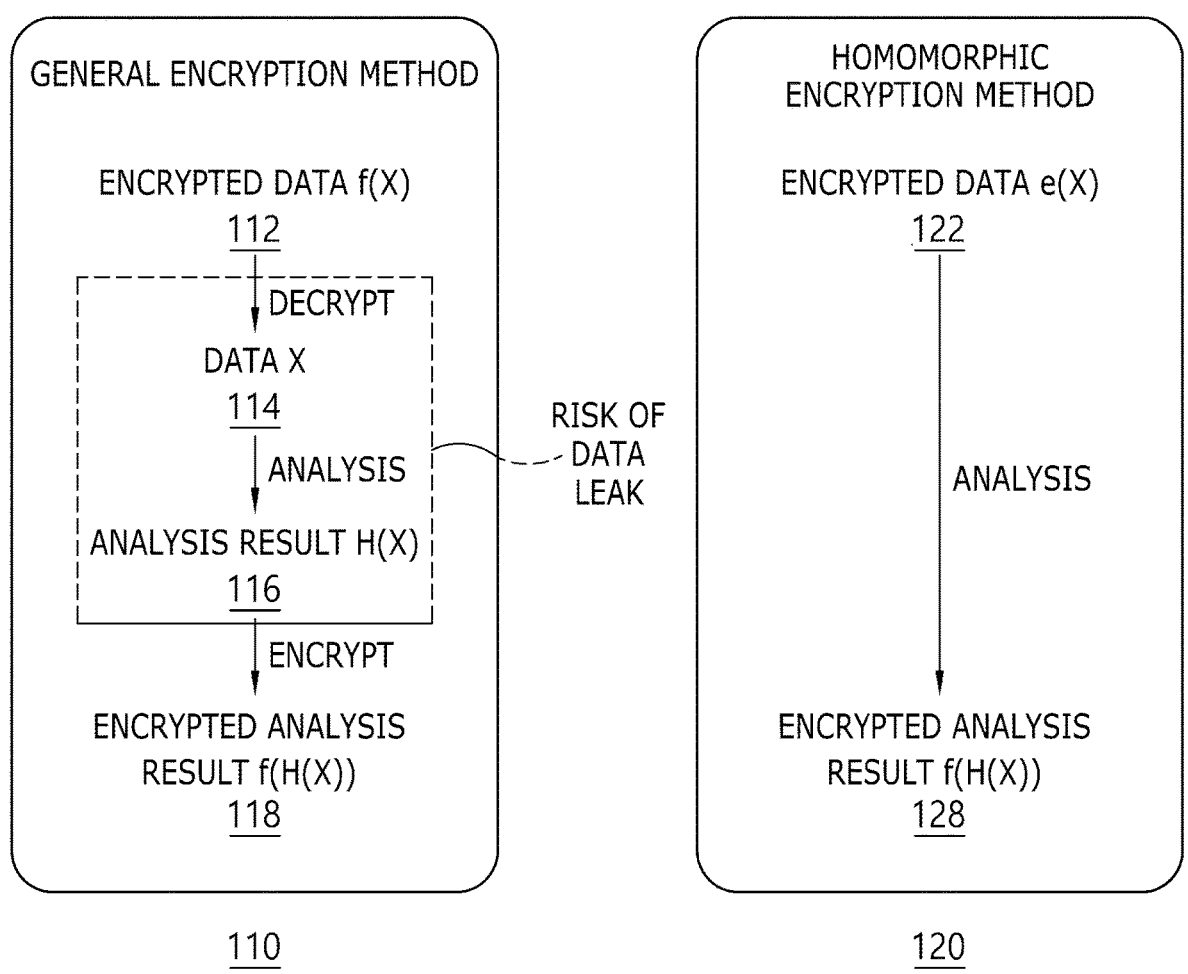
FIG. 1 is a conceptual diagram for explaining a homomorphic encryption method according to an embodiment.

Hereinafter, specific details for the practice of the present disclosure will be described in detail with reference to the accompanying drawings. However, in the following description, detailed description of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, the term may be arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, the "system" may refer to at least one of a server device and a cloud device, but not limited thereto. For example, the system may include one or more server devices. In another example, the system may include one or more cloud devices. In another example, the system may be configured together with both a server device and a cloud device and operated.

In the present disclosure, a "display" may refer to any display device associated with a computing device, and for example, it may refer to any display device that is controlled by the computing device, or that can display any information/data provided from the computing device.

In the present disclosure, a "blockchain" is a system in a distributed environment which can exchange generally digitized information, assets, or transactions, and may refer to a system or platform that records the history of electronic transaction details generated in a peer-to-peer (P2P) network using a shared ledger. In this example, the blockchain uses a decentralized or distributed consensus mechanism, and a validating node on the network can approve (or disapprove) the transaction by executing the same (or agreed upon) consensus algorithm on the same transaction. In addition, in the present disclosure, a "node" may refer to a computing device that can record, maintain, and store a shared ledger in a blockchain, and has computational power capable of recording and processing transaction details such as block generation. In addition, "blockchain" or "blockchain platform" may refer to a blockchain network formed of one or more blockchain nodes connected by a network.

In the present disclosure, "each of a plurality of A" may refer to each of all components included in the plurality of A, or may refer to each of some of the components included in a plurality of A.

Embodiments will be described in detail below, regarding a computing method, computer program stored in a recording medium and apparatus (system) for privacy-preserving data analysis, which are implemented such that data requiring privacy protection can be used on a blockchain network without a concern of data leakage.

FIG. 1 is a conceptual diagram for explaining a homomorphic encryption method according to an embodiment. FIG. 1 shows a general encryption method 110 on the left-hand side of the drawing, and a homomorphic encryption method 120 according to an embodiment on the right-hand side of the drawing.

For example, when encrypted data f(x) 112 is received from a client (not illustrated), the general encryption method 110 performs decryption (using a predetermined encryption (or decryption) key, and the like), and analyzes the decrypted data x 114. Then, analysis result H(X) 116 is encrypted again, and an encrypted analysis result f(H(X)) 118 is transmitted to the client. When the client receives the encrypted analysis result f(H(X)), the client decrypts the same and checks the analysis result. Since the general encryption method 110 decrypts the encrypted data f(x) 112 to perform analysis operation, there is a risk that personal information included in the decrypted data x 114 and/or the analysis result H(X) 116 may be leaked. In addition, in the repeated process of encryption and decryption, there is also a concern that the amount of data transmission increases and keys used for encryption and decryption may be leaked.

Meanwhile, when encrypted data e(x) 122 is received from a client (not illustrated), the homomorphic encryption method 120 performs analysis or computation on the data as encrypted, that is, without the need to decrypt the encrypted data. Then, encrypted analysis or calculation result H(e(X)) 128 is transmitted to the client. The client may decrypt the encrypted analysis result H(e(X)) 128 and check the analysis result. As such, with the homomorphic encryption method 120, since there is no need to decrypt the encrypted data for data analysis or calculation, there is no need to share the user's key, and accordingly, there is no risk of leakage of personal information.

The types of homomorphic encryption are broadly divided into partially homomorphic encryption ("PHE encryption"), somewhat homomorphic encryption ("SHE encryption"), and fully homomorphic encryption ("FHE encryption"). The PHE encryption maintains the confidentiality of sensitive data by performing only selected mathematical functions on the encrypted values. Although the SHE encryption supports operations limited to a certain complexity, it supports these operations to be performed only a fixed number of times. The FHE encryption supports secure maintenance of information and accessibility, while providing full privacy. In the present disclosure, the FHE encryption method may be applied to enable complete protection of personal information. Meanwhile, it is to be noted that the SHE encryption or PHE encryption method can be replaced and/or used in combination.

Figure 2:
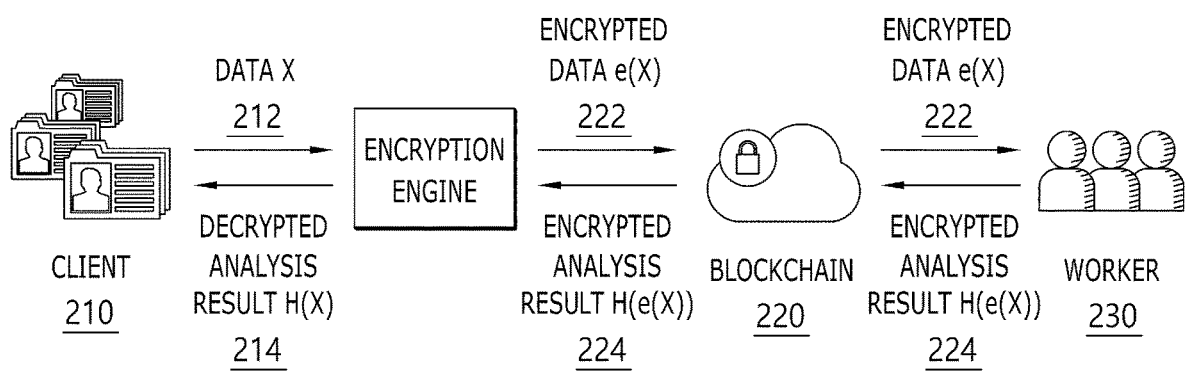
FIG. 2 is a diagram illustrating an example of providing an analysis result of privacy-preserving data to a client using an encryption engine, a blockchain, and a worker according to an embodiment.

FIG. 2 is a diagram illustrating an example of providing an analysis result of privacy-preserving data to the client using the encryption engine, the blockchain, and the worker according to an embodiment. In FIG. 2, the flow of transmitting the data-to-be-analyzed, and the flow of transmitting the analysis results according to the present disclosure have been mainly described. Accordingly, it is to be noted that the operations described in FIG. 2 may be performed by one or more devices and/or systems (or one or more processors included in the devices or systems).

In response to receiving a data analysis request from a client 210, data-to-be-analyzed X 212 is transmitted to the encryption engine. In an embodiment, the data analysis request may include identification information associated with the client 210, for example, user identification information (e.g., password, UID, verifiable credential (VC), and/or user biometric information, and the like) encrypted with a private key. In an embodiment, the data analysis request may include information on an analysis target, for example, information on disease analysis (e.g., diabetes analysis, hyperlipidemia analysis, hypothyroidism/hyperthyroidism analysis, hepatitis analysis, and the like).

The encryption engine may homomorphically encrypt the received data-to-be-analyzed X 212 using a pre-stored algorithm (e.g., a homomorphic cipher algorithm, and the like). Specifically, the encryption engine may apply the pre-stored algorithm to the received data-to-be-analyzed X 212 to generate encrypted data e(X) 222, and upload the encrypted data e(X) 222 to a target path of a blockchain 220. In an embodiment, the target path of the blockchain 220 may be designated as a path associated with any one of identification information associated with the client or information on the analysis target. In an embodiment, when there is a plurality of encrypted data e(X) 222, the data may be uploaded to target paths different from each other, and a degree of association between the target paths different from each other may correspond to a degree of association between a plurality of data.

The encrypted data e(X) 222 uploaded to the blockchain 220 is transmitted to a worker 230 linked to the blockchain 220 and associated with the target path. To this end, when the encrypted data e(X) 222 is uploaded to the target path of the blockchain 220, it is operated such that a request for analysis operation is transmitted to the worker 230 associated with the target path.

The worker 230 performs an analysis operation on the encrypted data e(X) 222 in the encrypted state, i.e., without decrypting the data. The worker 230 may use a pre-stored encryption operation program to analyze the encrypted data e(X) 222 in the encrypted form. For example, for bitwise operation on the encrypted data e(X) 222, the encryption operation program may include XOR operation logic, XNOR operation logic, AND operation logic, OR operation logic, complement operation logic, absolute value operation logic, move operation logic, and/or MUX operation logic and the like. The analysis result of the analysis operation performed by the worker 230, that is, the encrypted analysis result H(e(X)) 224 is stored in a path designated in association with the target path. In this case, the target path where the encrypted data e(X) 222 is uploaded and the designated path where the encrypted analysis result H(e(X)) 224 is stored may be different from each other.

The client 210 may receive a notification informing that the analysis operation was completed, in response to the encrypted analysis result H(e(X)) 224 being stored in the designated path. The encryption engine decrypts the encrypted analysis result H(e(X)) 224 and transmits a decrypted analysis result H(X) 214 to the client 210. In an embodiment, in response to receiving a request to check analysis result from the client 210, the encrypted analysis result H(e(X)) 224 may be decrypted, and the decrypted analysis result H(X) 214 may be transmitted. Alternatively, in an embodiment, in response to receiving the request to check analysis result from the client 210, the encrypted analysis result H(e(X)) 224 stored in the designated path of the blockchain 220 may be received, and the received encrypted analysis result H(e(X)) 224 may be decrypted, and the decrypted analysis result H(X) 214 may be transmitted. In an example, the request to check analysis result may include at least one or more information of identification information associated with the client 210, information on analysis target, target path, and/or designated path.

Figure 3:
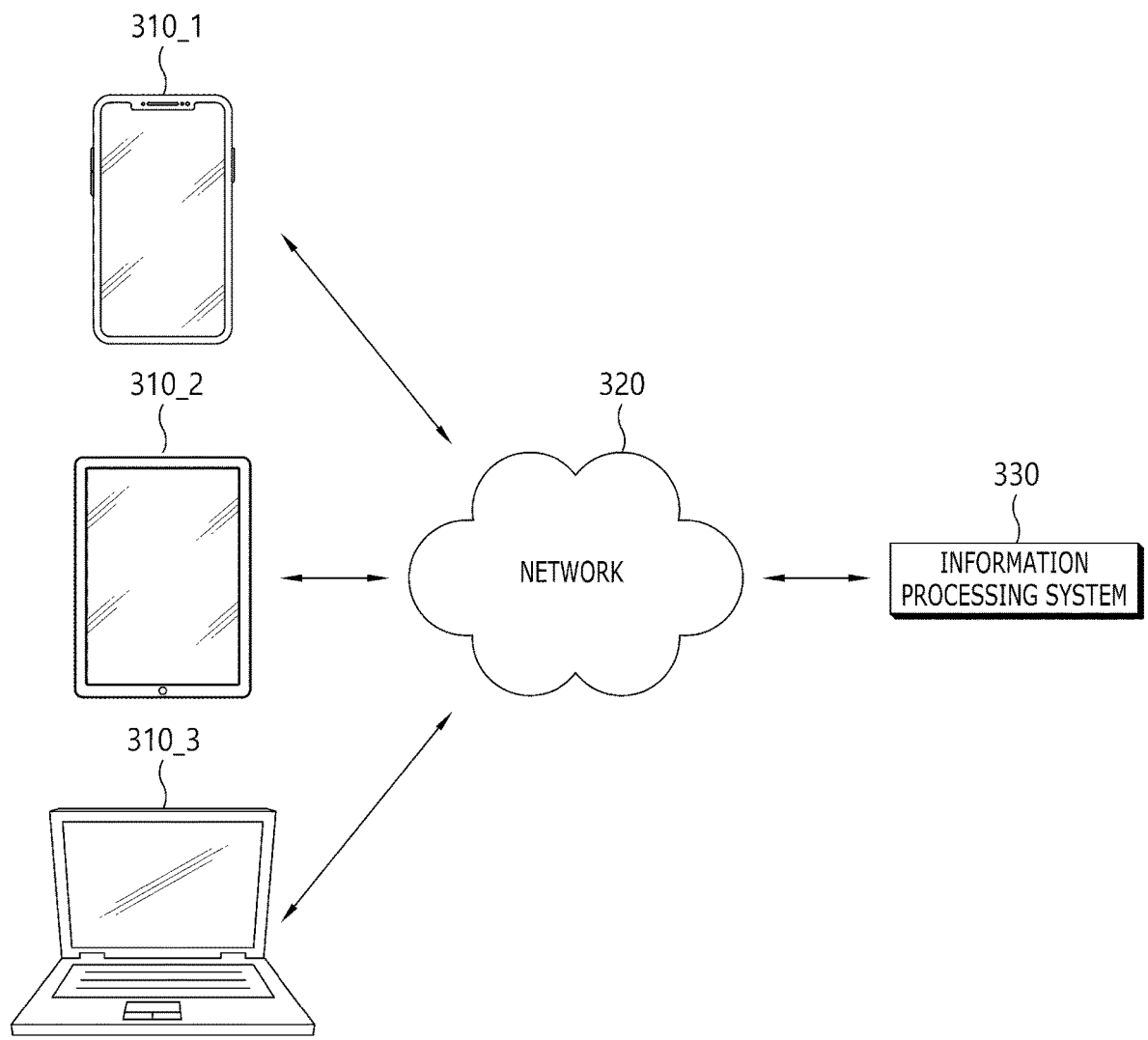
FIG. 3 is a schematic diagram illustrating a configuration in which an information processing system is communicatively connected to a plurality of user terminals according to an embodiment.

FIG. 3 is a schematic diagram illustrating a configuration in which an information processing system 330 is communicatively connected to a plurality of user terminals 310_1, 310_2, and 310_3 according to an embodiment. As illustrated, the plurality of user terminals 310_1, 310_2, and 310_3 may be connected to the information processing system 330 that may provide an analysis result of privacy-preserving data through a network 320. In an example, the plurality of user terminals 310_1, 310_2, and 310_3 may include a terminal of user and/or operator with access permission (e.g., an administrator with access permission to privacy-preserving data, and the like), which is capable of receiving an analysis result of privacy-preserving data using the user identification information (e.g., password, UID, verifiable credential (VC), and/or user biometric information, and the like) identified by a private key. In an embodiment, the information processing system 330 may include one or more server devices and/or databases, or one or more distributed computing devices and/or distributed databases based on cloud computing services that can store, provide and execute computer-executable programs (e.g., downloadable applications) and data related to the privacy-preserving data analysis.

The analysis result of the privacy-preserving data provided by the information processing system 330 may be provided to the user through an application related to the privacy-preserving data analysis installed in each of the plurality of user terminals 310_1, 310_2, and 310_3, a healthcare application, a disease analysis/prediction application, a mobile browser application, a web browser, or a web browser extension program or the like. For example, the information processing system 330 may provide corresponding information or perform a process corresponding to a request for analysis of various healthcare-related data, which is received from the user terminals 310_1, 310_2, and 310_3 through a healthcare application or the like.

The plurality of user terminals 310_1, 310_2, and 310_3 may communicate with the information processing system 330 through the network 320. The network 320 may be configured to enable communication between the plurality of user terminals 310_1, 310_2, and 310_3 and the information processing system 330. The network 320 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and the like) that may be included in the network 320 as well as short-range wireless communication between user terminals 310_1, 310_2 and 310_3.

In FIG. 3, a mobile phone terminal 310_1, a tablet terminal 310_2, and a PC terminal 310_3 are illustrated as examples of the user terminals, but are not limited thereto, and the user terminals 310_1, 310_2, and 310_3 may be any computing device that is capable of wired and/or wireless communication and that can be installed with an application related to privacy-preserving data analysis, a healthcare application, a disease analysis/prediction application, a mobile browser application, a web browser or a web browser extension program, and the like, and execute the same. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, FIG. 3 illustrates that three user terminals 310_1, 310_2, and 310_3 are in communication with the information processing system 330 through the network 320, but embodiments are not limited thereto, and a different number of user terminals may be configured to be in communication with the information processing system 330 through the network 320.

According to an embodiment, the information processing system 330 may receive a data analysis request including one or more data-to-be-analyzed (e.g., healthcare related data) from the plurality of user terminals 310_1, 310_2, and 310_3. The information processing system 330 may homomorphically encrypt the received data-to-be-analyzed, upload the homomorphically encrypted data-to-be-analyzed to the target path of the blockchain, and provide a result of the analysis operation performed by the worker associated with the target path to a plurality of matching user terminals 310_1, 310_2, and 310_3 (e.g., the terminal of user/operator having access to the private key and requesting the analysis of healthcare-related data). Additionally or alternatively, in response to the data analysis request of the plurality of user terminals 310_1, 310_2, and 310_3, the information processing system 330 may request input of related user identification information (e.g., password, UID, verifiable credential (VC), and/or user biometric information, and the like) and/or information on analysis target (e.g., diabetes analysis, hyperlipidemia analysis, hypothyroidism/hyperthyroidism analysis, hepatitis analysis, and the like), and when the encrypted analysis result is stored in the designated storage path, the information processing system 330 may transmit an analysis operation completion notification to the plurality of matching user terminals 310_1, 310_2, and 310_3. In this case, in response to receiving the request to check analysis result from the plurality of user terminals 310_1, 310_2, and 310_3, the information processing system 330 may decrypt the encrypted analysis result and provide the result. In this case, the request to check analysis result may include the user identification information identified by the private key and/or information on the analysis target.

Figure 4:
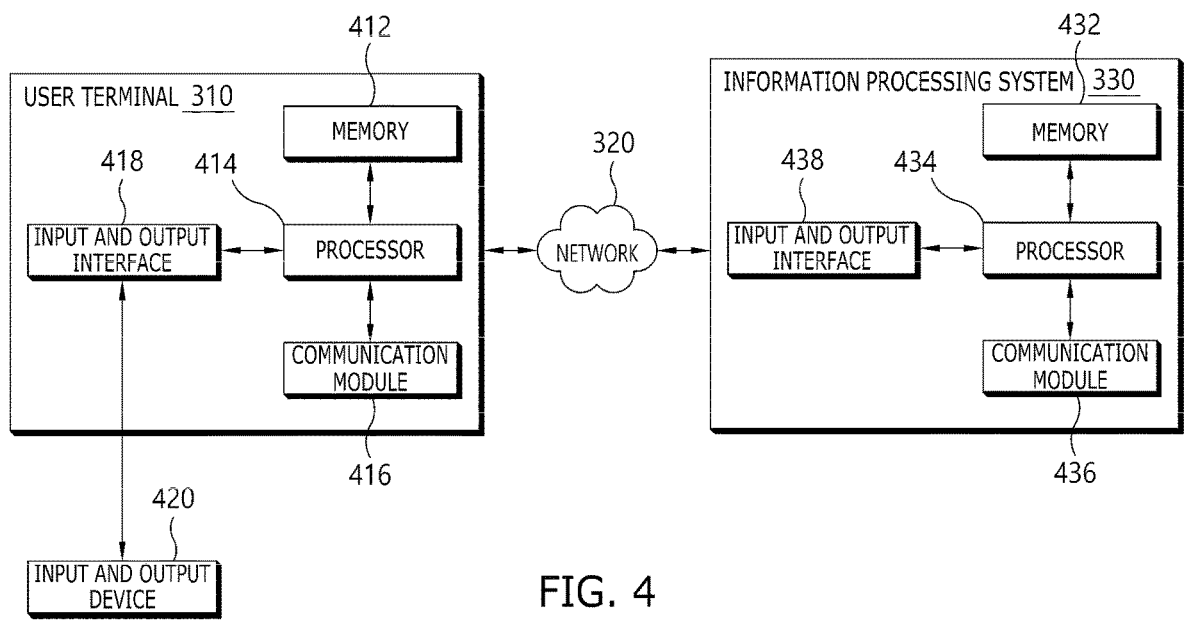
FIG. 4 is a block diagram illustrating an exemplary internal configuration of the information processing system and the user terminal according to an embodiment.

FIG. 4 is a block diagram illustrating an internal configuration of the user terminal 310 and the information processing system 330 according to an embodiment. The user terminal 310 may refer to any computing device that is capable of executing an application related to privacy-preserving data analysis, a healthcare application, a disease analysis/prediction application, a mobile browser application, a web browser or a web browser extension program, and the like, and also capable of wired/wireless communication, and the user terminal 310 may include the mobile phone terminal 310_1, the tablet terminal 310_2, and the PC terminal 310_3 of FIG. 4, for example. As illustrated, the user terminal 310 may include a memory 412, a processor 414, a communication module 416, and an input and output interface 418. Likewise, the information processing system 330 may include a memory 432, a processor 434, a communication module 436, and an input and output interface 438. As illustrated in FIG. 4, the user terminal 310 and the information processing system 330 may be configured to communicate information and/or data through the network 320 using the respective communication modules 416 and 436. In addition, an input and output device 420 may be configured to input information and/or data to the user terminal 310 or to output information and/or data generated from the user terminal 310 through the input and output interface 418.

The memories 412 and 432 may include any non-transitory computer-readable recording medium. According to an embodiment, the memories 412 and 432 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 310 or the information processing system 330 as a separate permanent storage device that is distinct from the memory. In addition, an operating system and at least one program code (e.g., code for application related to privacy-preserving data analysis installed and driven in the user terminal 310, healthcare application, and the like) may be stored in the memories 412 and 432.

These software components may be loaded from a computer-readable recording medium separate from the memories 412 and 432. Such a separate computer-readable recording medium may include a recording medium directly connectable to the user terminal 310 and the information processing system 330, and may include a computer-readable recording medium such as a floppy drive, a disk, a tape, a DVD/CD-ROM drive, a memory card, and so on, for example. As another example, the software components may be loaded into the memories 412 and 432 through the communication modules rather than the computer-readable recording medium. For example, at least one program may be loaded into the memories 412 and 432 based on a computer program installed by files provided by developers or a file distribution system that distributes an installation file of an application through the network 320.

The processors 414 and 434 may be configured to process the instructions of the computer program by performing basic arithmetic, logic, and input and output operations. The instructions may be provided to the processors 414 and 434 from the memories 412 and 432 or the communication modules 416 and 436. For example, the processors 414 and 434 may be configured to execute the received instructions according to program code stored in a recording device such as the memories 412 and 432.

The communication modules 416 and 436 may provide a configuration or function for the user terminal 310 and the information processing system 330 to communicate with each other through the network 320, and may provide a configuration or function for the user terminal 310 and/or the information processing system 330 to communicate with another user terminal or another system (e.g., a separate cloud system or the like). For example, a request or data (e.g., request for privacy-preserving data analysis, request to check analysis results of privacy-preserving data, data associated with user identification information, data related to information on the analysis target, data related to target path of blockchain and/or designated storage path, and the like) created by the processor 414 of the user terminal 310 according to the program code stored in a recording device such as the memory 412 or the like may be transmitted to the information processing system 330 through the network 320 under the control of the communication module 416. Conversely, a control signal or a command provided under the control of the processor 434 of the information processing system 330 may be received by the user terminal 310 through the communication module 416 of the user terminal 310 via the communication module 436 and the network 320. For example, the user terminal 310 may receive the analysis result of the data-to-be-analyzed, e.g., an analysis result on the risk of a specific disease in the decrypted form from the information processing system 330 through the communication module 416.

The input and output interface 418 may be a means for interfacing with the input and output device 420. As an example, the input device may include a device such as a camera, a keyboard, a microphone, a mouse, and so on, which includes an audio sensor and/or an image sensor, and the output device may include a device such as a display, a speaker, a haptic feedback device, and so on. As another example, the input and output interface 418 may be a means for interfacing with a device, such as, for example, a touch screen or the like that integrates a configuration or function for performing inputting and outputting. For example, when the processor 414 of the user terminal 310 processes the instructions of the computer program loaded in the memory 412, a service screen or the like, which is configured with the information and/or data provided by the information processing system 330 or other user terminals, may be displayed on the display through the input and output interface 418. While FIG. 4 illustrates that the input and output device 420 is not included in the user terminal 310, embodiments are not limited thereto, and the input and output device 320 may be configured as one device with the user terminal 310. In addition, the input and output interface 438 of the information processing system 330 may be a means for interfacing with an inputting or outputting device (not illustrated) that may be connected to the information processing system 330 or included in the information processing system 330. In FIG. 4, while the input and output interfaces 418 and 438 are illustrated as the components configured separately from the processors 414 and 434, embodiments are not limited thereto, and the input and output interfaces 418 and 438 may be configured to be included in the processors 414 and 434.

The user terminal 310 and the information processing system 330 may include more components than the components illustrated in FIG. 4. Meanwhile, most of the related components may not necessarily require exact illustration. According to an embodiment, the user terminal 310 may be implemented to include at least a part of the input and output device 420 described above. In addition, the user terminal 310 may further include other components such as a transceiver, a Global Positioning System (GPS) module, a camera, various sensors, a database, and the like. For example, when the user terminal 310 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and so on are further included in the user terminal 310. According to an embodiment, the processor 414 of the user terminal 310 may be configured to operate an application and the like related to healthcare-related data analysis. In this case, a code associated with the application and/or program may be loaded into the memory 412 of the user terminal 310.

While a program for applications or the like related to healthcare-related data analysis is being operated, the processor 414 may receive text, image, video, audio, and/or action, and so on inputted or selected through the input device such as a camera, a microphone, and so on which includes a touch screen, a keyboard, an audio sensor and/or an image sensor connected to the input and output interface 418, and store the received text, image, video, audio, and/or action, and so on in the memory 412, or provide the same to the information processing system 330 through the communication module 416 and the network 320.

For example, the processor 414 may receive an input of request for analysis of healthcare-related data including user personal information and analysis target information, and provide the same to the information processing system 330 through the communication module 416 and the network 320. As another example, the processor 414 may receive an input of selecting one or more analysis target information from a list generated (or displayed) according to the request for analysis of healthcare-related data including user personal information, and provide the same to the information processing system 330 through the communication module 416 and the network 320. As still another example, the processor 414 may receive an input of request for analysis of healthcare-related data including only the analysis target information, provide the same to the information processing system 330 through the communication module 416 and the network 320, and allow the information processing system 330 to perform analysis of healthcare-related data for a large number of unspecified persons. As another example, the processor 414 may receive an input of request for analysis of healthcare-related data including the user personal information and the analysis target information for each target, and provide the same to the information processing system 330 through the communication module 416 and the network 320.

The processor 414 of the user terminal 310 may be configured to manage, process, and/or store the information and/or data received from the input device 420, the other user terminals, the information processing system 330 and/or a plurality of external systems. The information and/or data processed by the processor 414 may be provided to the information processing system 330 through the communication module 416 and the network 320. The processor 414 of the user terminal 310 may transmit the information and/or data to the input and output device 420 through the input and output interface 418 to output the same. For example, the processor 414 may display the received information and/or data on the screen of the user terminal.

The processor 434 of the information processing system 330 may be configured to manage, process, and/or store information and/or data received from a plurality of user terminals 310 and/or a plurality of external systems. The information and/or data processed by the processor 434 may be provided to the user terminals 310 through the communication module 436 and the network 320. In an embodiment, the processor 434 of the information processing system 330 may homomorphically encrypt the received data-to-be-analyzed based on a data analysis request including one or more data-to-be-analyzed (e.g., healthcare related data) received from the plurality of user terminals 310, and upload the homomorphically encrypted data-to-be-analyzed to the target path of the blockchain, and provide a result of the analysis operation performed by the worker to the plurality of matching user terminals 310_1, 310_2, and 310_3 (e.g., terminal of user/operator having access to the private key and requesting the analysis of healthcare-related data).

The processor 434 of the information processing system 330 may be configured to output the processed information and/or data through the output device 420 such as a device (e.g., a touch screen, a display, and so on) capable of outputting a display of the user terminal 310 or a device (e.g., a speaker) capable of outputting an audio. For example, the processor 434 of the information processing system 330 may be configured to decrypt the analysis result stored in the designated path of the blockchain, provide the result to the user terminal 310 through the communication module 436 and the network 320, and output the decrypted analysis result through a device capable of outputting a display, or the like of the user terminal 310. As another example, in response to a request to check result by the processor 414 of the user terminal 310, the processor 434 of the information processing system 330 may be configured to provide the homomorphically encrypted analysis result and the decryption program to the user terminal 310 through the communication module 436 and the network 320, decrypt the same in the user terminal 310, and output the decrypted analysis result through a device capable of outputting a display of the user terminal 310, and the like. As still another example, the processor 434 of the information processing system 330 may be configured to provide the homomorphically encrypted analysis result stored in a plurality of designated paths different from each other through the communication module 436 and the network 320, and output a plurality of decrypted analysis results on one screen through a device capable of outputting a display or the like of the user terminal 310 or output it for each separate tab.

Figure 5:
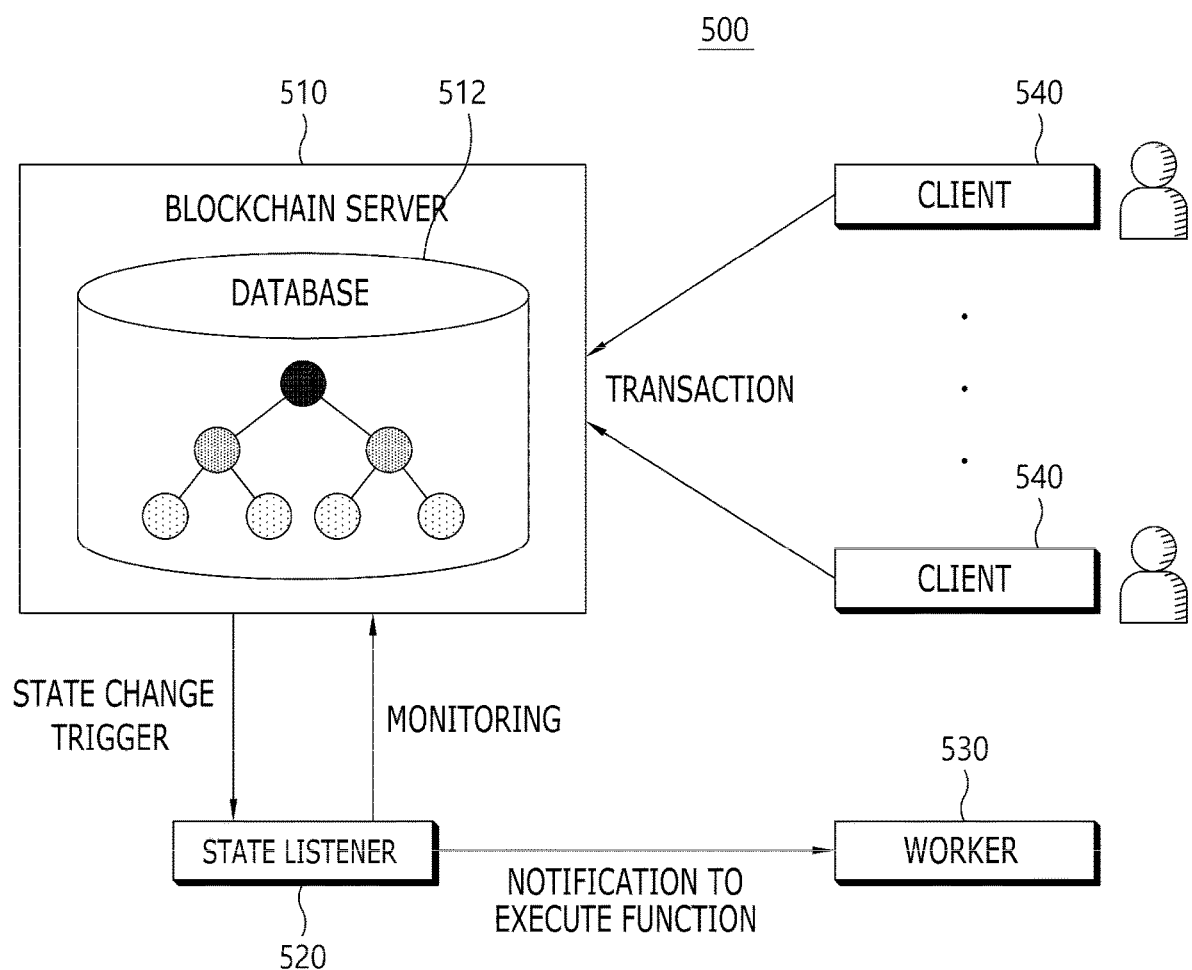
FIG. 5 is a diagram illustrating a configuration of a blockchain-based serverless computing system according to an embodiment.

FIG. 5 is a diagram showing the configuration of a blockchain-based serverless computing system according to an embodiment. The computing system according to an embodiment may include a blockchain-based serverless computing system. The blockchain-based serverless computing system may serve as a backend system for running applications. In this system, the application may be run as follows. First, when a client (configuration such as client, decentralized application (dApp), encryption engine, at least part of computing system, and the like) transmits a transaction to the blockchain, the block state of the blockchain node is updated by the data of the corresponding transaction (e.g., path-value pair). Meanwhile, a block state listener is monitoring the blockchain path and when detecting the state update by the transaction, transmits the event to the worker. Upon receiving the event, the worker may execute an operation or function (e.g., data analysis operation) associated with the transaction and generate another transaction. When the worker generates another transaction, the block state of the blockchain node is updated by the corresponding transaction. In addition, the client may obtain the result through a modified blockchain state.

A blockchain-based serverless computing system 500 may include a blockchain server 510 that stores and manages a database including a plurality of block states, a state listener 520 that monitors whether or not the block state is changed, and a worker 530 that performs an operation according to the change of the block state.

As illustrated, the blockchain server (or node) 510 may include a database 512 including a plurality of block states. In an embodiment, each block state stored in the database 512 may include a balance of each public key and a key-value database. The block state may be one of two types: master state and rule state. The master state may store actual data updated by all participating nodes in the blockchain network. In addition, the rule state may include a rule for determining access permission to change a data value corresponding to the key.

In addition, the database 512 may be configured in a tree structure. The database 512 configured in a tree structure may maintain a subset (or sub-tree) of the tree as a shard by applying a sharding technique. In the present disclosure, "sharding" may refer to an on-chain solution that provides scalability to the blockchain by partitioning the entire blockchain network and storing the transactions per section and processing them in parallel. Since each sub-tree managed with the shard is processed on a separate small blockchain instance, there can be an effect of greatly increased total throughput of the blockchain. In an embodiment, it may be established such that different consensus algorithms are applied to each sub-tree of the database 512.

The state listener 520 may monitor whether the block state of the blockchain stored in the database 512 is changed. In an embodiment, after the worker 530 is set to execute a new operation, the state listener 520 may be registered and installed in the worker 530 as a module that is generated or executed by the worker 530 or may be registered and installed in the blockchain server 510.

The blockchain server 510 may set the permission to change the block state of the database 512, and may set a function to be executed when a transaction is received from one or more clients 540 and changes the block state. In addition, when receiving a transaction from one or more clients 540, the blockchain server 510 may change the blockchain block state according to the transaction, and the state listener 520 may monitor the blockchain server 510 to detect a change of the block state. When detecting a change of the block state, the state listener 520 may notify the worker 530 to execute a function according to the change of the block state. In an embodiment, the worker 530 may generate another transaction as a result of executing the function according to the change of the block state. In this case, the worker 530 may transmit the newly generated transaction to the blockchain server 510 and update the block state. Such an update of the block state in the blockchain server 510 may cause a chained-reaction leading to the execution of additional operations. That is, when the transaction generated by the worker is transmitted to the blockchain server 510 and the block state is updated, the state listener 520 may detect the state update and notify the worker 530 or another worker to execute the related operation.

In an embodiment, the blockchain server 510 and the worker 530 described above may be included in one node of the blockchain network. In this case, the blockchain server 510 and the worker 530 may immediately execute a related operation in response to the received transaction. In another embodiment, the worker 530 may be implemented to be detachable and may be hosted by another computing device (or resource provider). In this case, a separate communication channel from the computing device to the blockchain server 510 may be formed.

Figure 6:
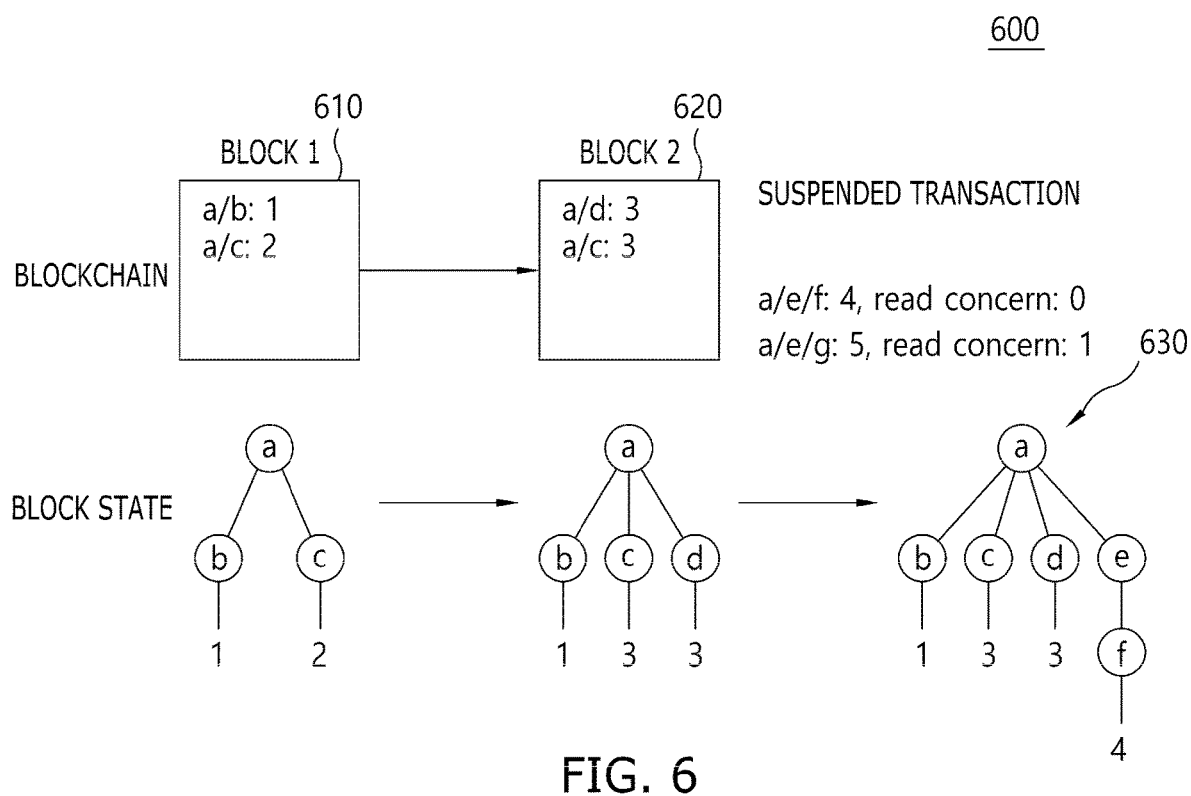
FIG. 6 is a diagram illustrating a state change of a blockchain database according to read_concern according to an embodiment.

FIG. 6 is a diagram illustrating a state change of a blockchain database according to read_concern according to an embodiment. A database 600 illustrated in FIG. 6 may represent a detailed configuration of the databases 512 stored and managed by the blockchain servers 510 of the blockchain-based serverless computing system described with reference to FIG. 5.

As illustrated, the database 600 may include blocks 610 and 620 including transactions and block states 630 corresponding thereto. For example, a block 610 is generated, including transactions "a/b: 1" and "a/c: 2", and correspondingly, the block state 630 is updated to reflect value "1" in the path "a/b" and reflect value "2" in the path "a/c". Next, a block 620 is generated, including transactions "a/d: 3" and "a/c: 3", and correspondingly, the block state 630 maintains value "1" in the path "a/b", and is updated such that the value of the path "a/c" is changed from "2" to "3" and value "3" is reflect in the path "a/d".

Meanwhile, in the transaction pool of the blockchain server, transactions ("a/e/f: 4", "a/e/g: 5") that have not yet been added as blocks to the blockchain are stored. These transactions may further include read_concern field in addition to the path (key)-value pair. The read_concern is a value that may be included when generating a transaction, and may indicate whether the data of the corresponding transaction is reliable enough to be reflected in the block state of the blockchain.

In an embodiment, when the client generates a transaction, it may include information on the read_concern in the transaction, and the value may be arbitrarily set by the client. The first node of the blockchain server may reflect the key-value pair of the transaction in the block state based on the value of the read_concern of each transaction. For example, if the value of the read_concern is 0, based on a determination that the reliability is high enough to be used even before the block including the data of the corresponding transaction is generated, the data of the corresponding transaction may be immediately reflected in the block state of the database. In other words, the blockchain server may immediately execute the transaction if the value of the transaction read_concern is 0. Meanwhile, if the value of the read_concern is 1 or greater, the execution of the transaction may be suspended until there is one or more generations of the block including the data of the transaction.

In the example of FIG. 6, since the value of the read_concern of the transaction "a/e/g: 5" is assigned as 1 and is recommended to be read after a block is generated one time, the execution may be suspended without reflecting the data in the block state 630. Meanwhile, since the value of the read_concern of the transaction "a/e/f: 4" is assigned as 0, the transaction may be immediately executed and reflected in the block state 630.

Figure 7:
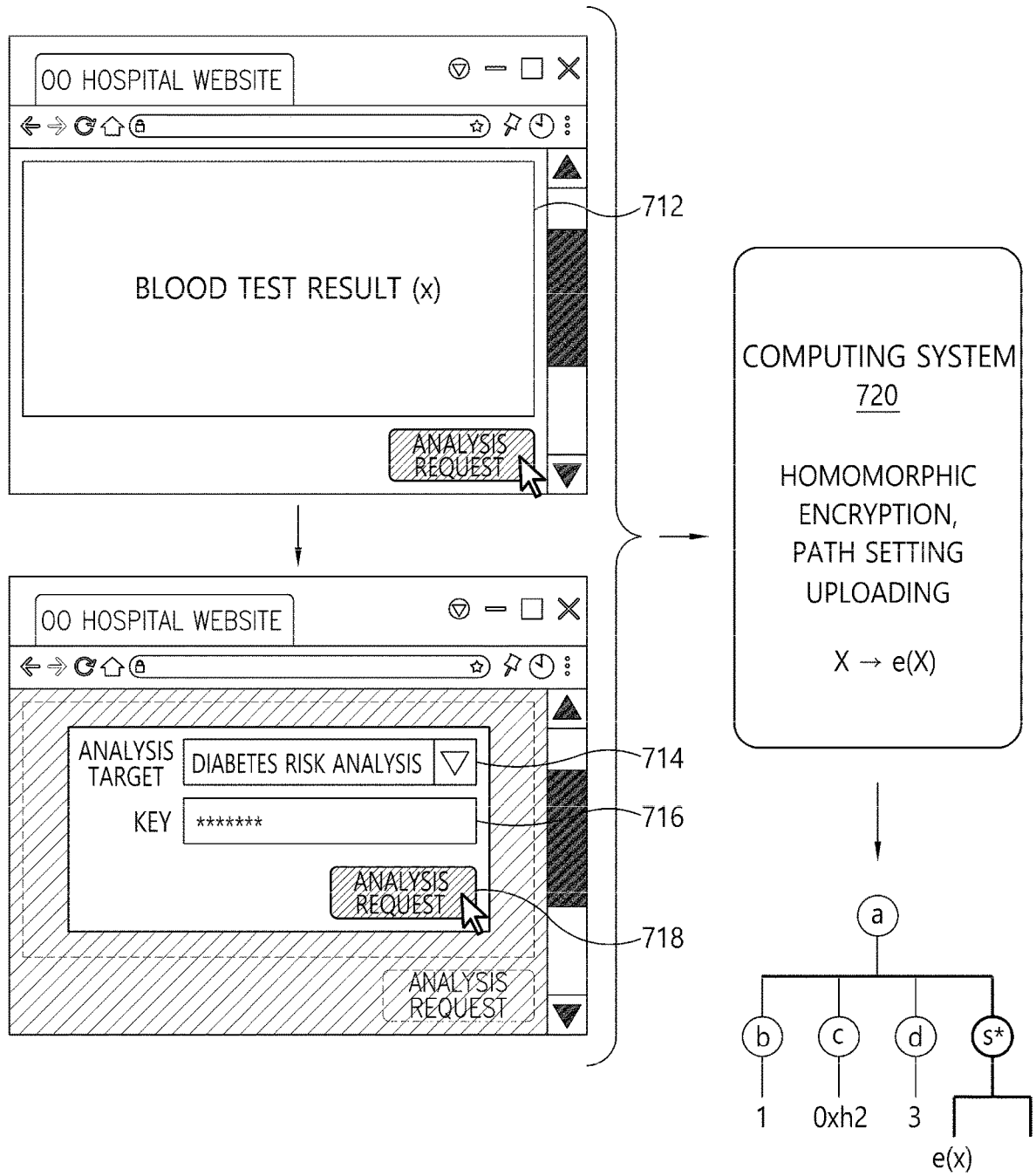
FIG. 7 is a block diagram illustrating a process of uploading homomorphically encrypted data to a target path of a blockchain based on a request for analysis of data-to-be-analyzed according to an embodiment.

FIG. 7 is a block diagram illustrating a process of uploading homomorphically encrypted data to the target path of the blockchain based on a request for analysis of the data-to-be-analyzed according to an embodiment.

In FIG. 7, a computing system 720 according to the present disclosure may receive a request for analysis of data through the user terminal of a client (e.g., a user of a computing system for privacy-preserving data analysis, a healthcare service platform (or its user), a hospital (or its user), and the like).

For example, by accessing a hospital website through the user terminal of the client, it is possible to input a request for analysis of requested data 712 (e.g., blood test result x) including personal information provided from the hospital website. Next, data-to-be-analyzed 714 (e.g., diabetes risk analysis) may be selected using the user interface screen displayed on the user terminal of the client, and user identification information 716 identified by a private key may be input and then an analysis request 718 may be input (or selected) to transmit the analysis request to the computing system 720. In this case, the private key is for the user to sign in, which may be separate from the encryption key and stored in an electronic wallet or the like of the blockchain, for example.

For example, the computing system 720 may be implemented as a web browser extension program (e.g., a Chrome extension, and the like). In this case, after the client accesses an application/web service including the analysis requested data (e.g., blood test results x), such as hospital website for example, the data analysis request may be performed through an extension program without leaving the hospital website. In another example, the computing system 720 may be implemented to be linked with a plurality of applications/web services (e.g., hospital A website, hospital B website, healthcare service platform, and the like). In this case, for example, the user may access one of the hospital websites without having to access both the hospital A website and hospital B website, respectively, and then use the same private key to request to upload the medical data recorded in hospital A and the medical data recorded in hospital B as homomorphic encryption data in the same target path of the blockchain.

In response to the analysis request 718, the computing system 720 may receive the analysis requested data 712 (e.g., blood test result x) including personal information, the data-to-be-analyzed 714 (e.g., diabetes risk analysis), and identification information associated with the client (e.g., the user identification information 716 identified by a private key). The computing system 720 homomorphically encrypts the received data 712 and 714 using the encryption engine, sets the target path of the blockchain, and uploads (or stores) the homomorphically encrypted data e(X) to the set target path.

In an embodiment, user who can access the set target path may be designated in advance. In this case, the designated user may access the target path associated with at least one of user identification information matching the private key, or data-to-be-analyzed.

In another embodiment, when there is a plurality of data-to-be-analyzed (e.g., diabetes analysis, hyperlipidemia analysis, hypothyroidism/hyperthyroidism analysis, hepatitis analysis, and the like) for data containing personal information, target paths different from each other may be generated for each data-to-be-analyzed. In this case, while the same private key is used, homomorphically encrypted data for each data-to-be-analyzed may be stored in target paths different from each other. For example, when there is a plurality of data-to-be-analyzed (e.g., diabetes analysis, hyperlipidemia analysis, hypothyroidism/hyperthyroidism analysis, hepatitis analysis, and the like) for one analysis requested data (e.g., blood test result x) using the same private key, the first data-to-be-analyzed (e.g., diabetes analysis) may be homomorphically encrypted and stored in a first path, and the second data-to-be-analyzed (e.g., hyperlipidemia analysis) may be encrypted and stored in a second path different from the first path. In this case, the first path and the second path may include one or more common nodes and/or common paths.

When the homomorphically encrypted data e(X) is stored, as illustrated, a block state 730 of the blockchain corresponding to blocks including one or more transactions may be generated by reflecting the set target paths. For example, the block state 730 may be generated by reflecting the value "1" in path "a/b" corresponding to transactions "a/b:1", "a/c:0xh2", "a/d"3", reflecting the value "0xh2" in "a/c", and reflecting the value "3" in the path "a/d". In addition, the block state 730 may be generated (or updated) to reflect the homomorphically encrypted data "e(X)" with a value for a target path corresponding to the transaction "a/*s:e(X)", for example, for the path "a/*s" in a secret state. Then, a request for analysis operation on the homomorphically encrypted data e(X) may be transmitted to a worker associated with the path "a/*s" in a secret state.

Figure 8:
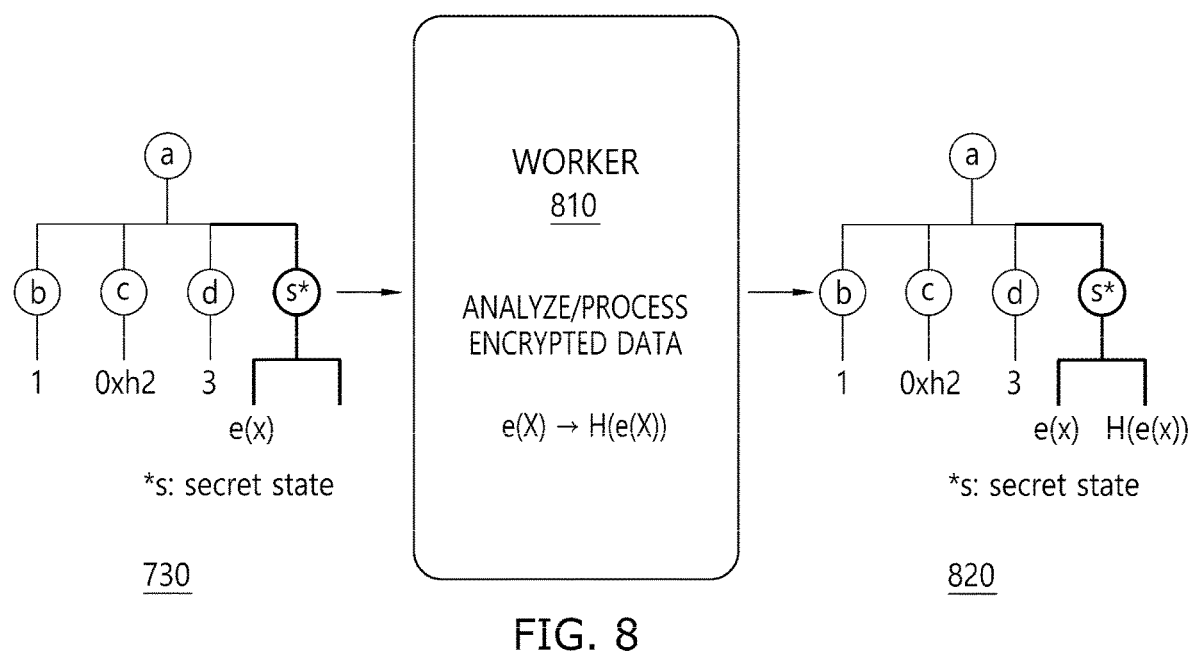
FIG. 8 is a block diagram illustrating a process of processing homomorphically encrypted data uploaded to the target path of the blockchain according to an embodiment.

FIG. 8 is a block diagram illustrating a process of processing homomorphically encrypted data uploaded to the target path of the blockchain according to an embodiment.

When the homomorphically encrypted data e(X) is stored, as illustrated, the block state 730 of the blockchain is updated to include the homomorphically encrypted data "e(X)" as a value for path "a/*s", and the block state listener executes monitoring on the blockchain path to detect the updated state of the block state 730. For example, when the path "a/*s" is created and the homomorphically encrypted data "e(X)" is uploaded as the value for "a/*s", the block state listener may detect the updated state of the block state 730.

In an embodiment, based on the update of the block state 730, the computing system 720 (FIG. 7) may request a worker associated with the target path, for example, a worker 810 associated with "a/*s" to perform analysis operation on the homomorphically encrypted data "e(X)". In another embodiment, the block state listener may transmit an event about the updated state to the worker 810 associated with the target path, and the worker 810 associated with the target path may request transmission/download of the homomorphically encrypted data "e(X)" in response to the received event.

The worker 810 downloads the homomorphically encrypted data "e(X)" recorded (or stored) in the target path (e.g., "a/*s"), and the worker 810 maintains the homomorphically encrypted state of "e(X)", and performs an analysis operation without decryption. The worker 810 may perform an operation necessary for data analysis and generate a result value without exposing personal information included in the homomorphically encrypted data "e(X)". The worker 810 may upload the homomorphically encrypted analysis result H(e(X)) generated according to the analysis result to a designated path (e.g., path "a/*s" in a secret state) in association with the target path.

In an embodiment, the target path of the homomorphically encrypted data "e(X)" and the designated path in which the homomorphically encrypted analysis result H(e(X)) is stored may include one or more common paths. In still another embodiment, access to the target path of homomorphically encrypted data "e(X)" and the designated path in which the homomorphically encrypted analysis result H(e(X)) is stored may be granted only to a user with access permission (e.g., the user who user signed in with the private key). In this case, other users who are not granted access permission may be restricted from accessing the target path and/or the designated path.

A block state 820 reflects an updated state having the homomorphically encrypted analysis result H(e(X)) as a value in the designated path "a/*s".

When the homomorphically encrypted analysis result H(e(X)) is stored and reflected in the block state 820, the block state listener may detect the updated state of the block state 820 and transmit a corresponding event to the computing system 720. As such, in the present disclosure, by performing the analysis operation on the analysis requested data without decrypting the homomorphically encrypted data "e(X)", and uploading in the form of homomorphically encrypted analysis result H(e(X)), there is no concern of leaking sensitive personal information while performing blockchain-based analysis operation.

Figure 9:
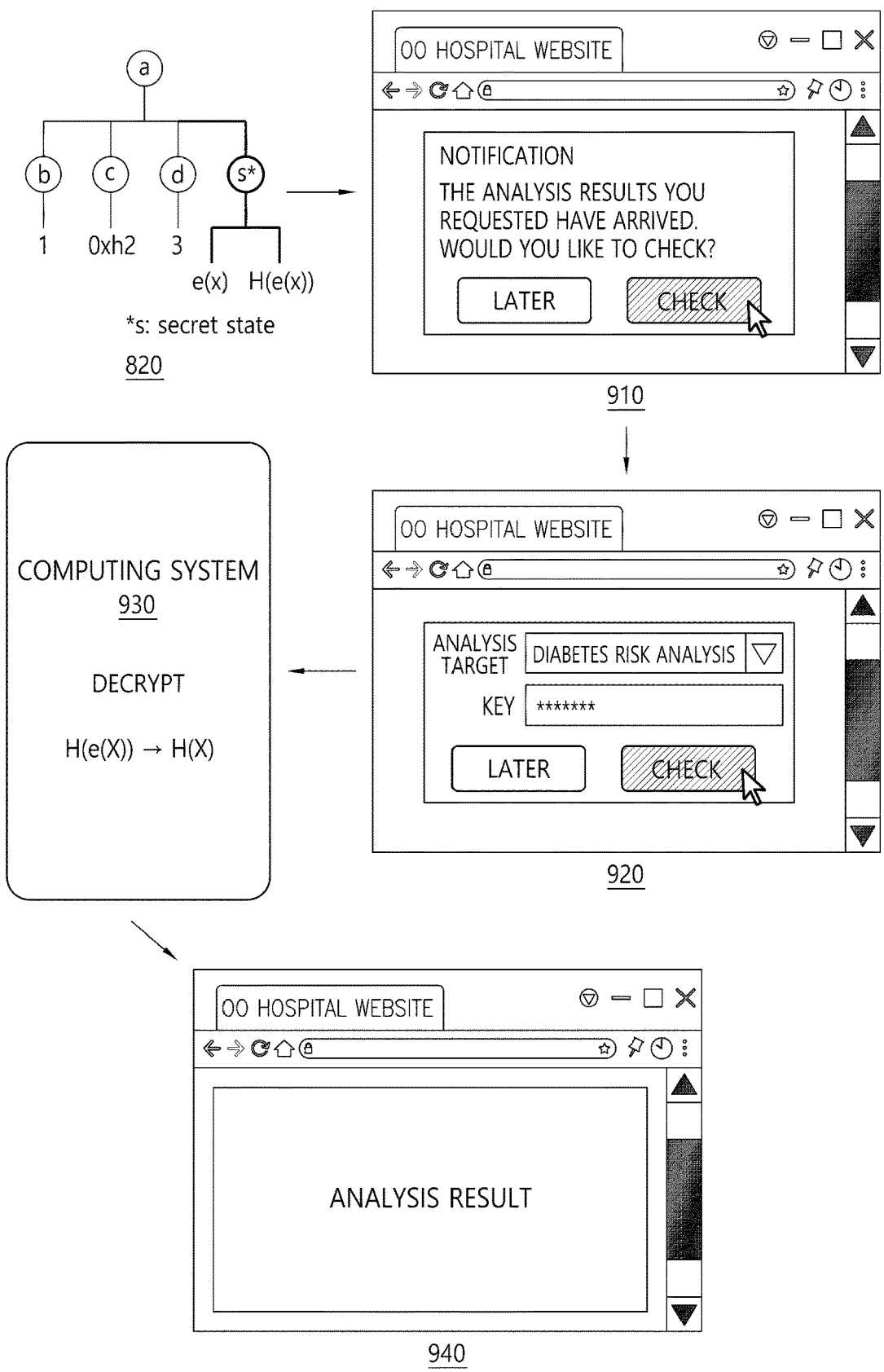
FIG. 9 is a block diagram illustrating a process of decrypting the analysis result of homomorphically encrypted data and providing the result according to an embodiment.

FIG. 9 is a block diagram illustrating a process of decrypting the analysis result of homomorphically encrypted data and providing the result according to an embodiment.

As illustrated, when the homomorphically encrypted analysis result H(e(X)) is reflected in the block state 820, the block state listener may transmit an event informing the user terminal of the client (e.g., users of computing systems for privacy-preserving data analysis, healthcare service platforms (or its user), hospitals (or its user), and the like) that the analysis operation is completed. Although not illustrated, in an embodiment, one or more devices/systems may intervene between the blockchain corresponding to the block state 820 and the user terminal of the client, and in this case, the devices/systems may include a block state listener.

When the homomorphically encrypted analysis result H(e(X)) is reflected in the block state 820, an analysis operation completion notification is transmitted to the application/web service (e.g., a hospital website) accessed by the client. Accordingly, as illustrated, a first user screen 910 for inquiring a request to check the analysis result may be output through a device having output function of the user terminal accessing the application/web service (e.g., hospital website).

When there is a plurality of analysis targets to check the analysis results, as illustrated, in response to the selection of a "check button" included in the first user screen 910, a second user screen 920 for selecting an analysis target to check may be output. The second user screen 920 may include a first input area for selecting an analysis target for which analysis result is available for checking and a second input area for inputting user identification information identified by the user's private key. In an embodiment, when the analysis target for which the analysis result is available for checking is specified in advance, the output of the first user screen 910 may be omitted, or the first user screen 910 may be switched to the second user screen 920 without requiring additional input.

A request to check analysis result for the selected analysis target (e.g., diabetes risk analysis) is generated using the second user screen 920, and the generated request to check analysis result is transmitted to a computing system 930. In an embodiment, the request to check analysis result may include information on at least one of identification information associated with the client (e.g., user identification information identified by private key, UID, and the like), information on analysis target (e.g., diabetes risk analysis), a target path to which homomorphically encrypted data-to-be-analyzed is uploaded, and/or a designated path in which homomorphically encrypted analysis results are stored.

In response to inputting the request to check analysis result using the second user screen 920, the computing system 930 may be operable to receive the homomorphically encrypted analysis result H(e(X)) stored in the designated path of the blockchain, for example, designated path "a/*s" recorded in the block state 820, and decrypt the homomorphically encrypted analysis result H(e(X)) using the encryption engine. Accordingly, when the homomorphically encrypted analysis result H(e(X)) is decrypted, the decrypted analysis result H(X) is transmitted to the application/web service (e.g., a hospital website) accessed by the client through the computing system 930. For example, as illustrated, a third user screen 940 including the decrypted analysis result H(X) may be output through a device having output function of the user terminal of the client.

In an embodiment, the analysis operation completion notification may not be transmitted to the client in response to the homomorphically encrypted analysis result H(e(X)) being uploaded (or stored). In this case, in response to the client with an intention to check the analysis result accessing the application/web service (e.g., hospital website) and inputting user identification information identified by the private key, a check request may be generated, and the computing system 930 may receive the request to check and provide the decrypted analysis result H(X) to the client.

Figure 10:
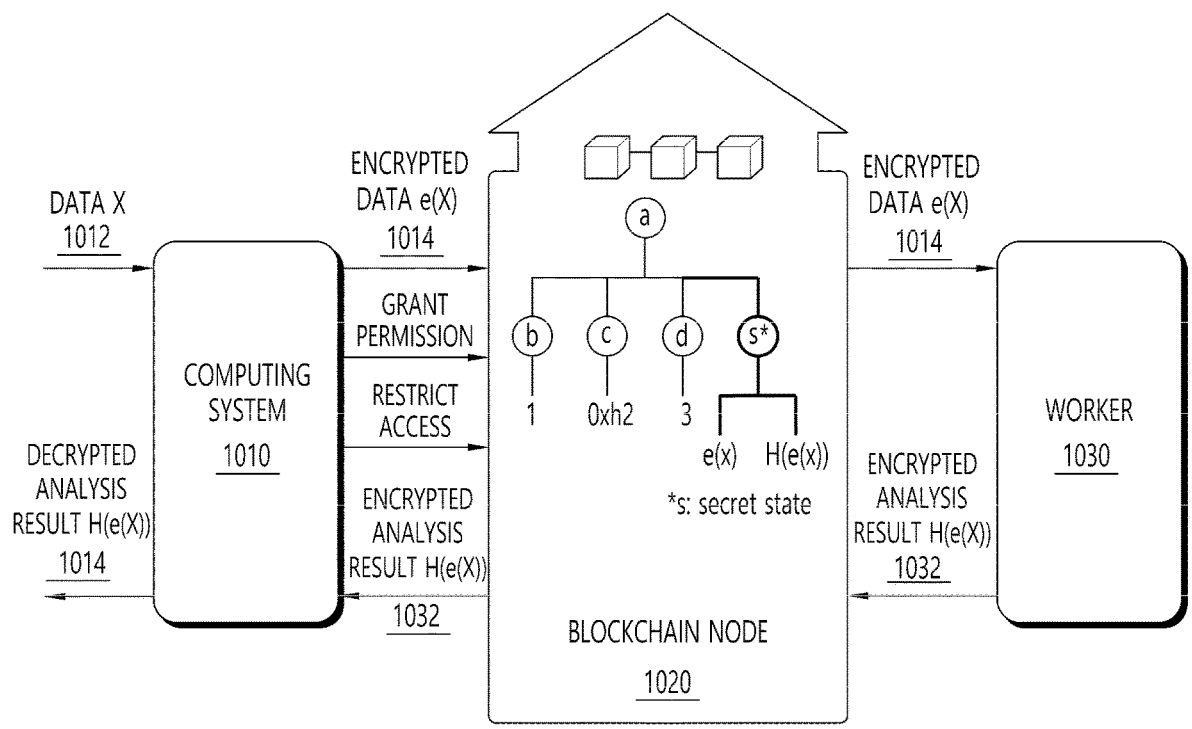
FIG. 10 is a diagram illustrating an example in which a computing system provides an analysis result of privacy-preserving data using a blockchain node and a worker according to an embodiment.

FIG. 10 is a diagram illustrating an example in which the computing system provides the analysis result of privacy-preserving data using a blockchain node and a worker according to an embodiment. In FIG. 10, a computing system 1010 (or a blockchain-based serverless computing system included therein) may restrict access permission such that only a specific user (e.g., only a user who signed in with the private key) can access a specific path of the blockchain.

As illustrated, the computing system 1010 may receive a request for analysis of privacy-preserving data from a client (not illustrated), and receive data-to-be-analyzed X 1012 accordingly. In an embodiment, the data-to-be-analyzed may include data extracted from a plurality of applications (and/or a plurality of web pages). In this case, the computing system 1010 may be implemented to be linked with a plurality of application/web services (e.g., hospital A website, hospital B website, healthcare service platform, and the like), and the client may transmit a single analysis request by applying the same private key to the plurality of privacy-preserving data provided by applications/web services different from each other (e.g., hospital A website, hospital B website, healthcare service platform, and the like).

The computing system 1010 receives the data-to-be-analyzed X 1012 in response to the analysis request, and homomorphically encrypts the data-to-be-analyzed X using the encryption engine. The homomorphically encrypted data e(X) 1014 is uploaded to the target path of the blockchain (e.g., "a/*s"). In an embodiment, the computing system 1010 generate a rule that authorizes only a specific user (e.g., only a user who signed in with the private key) to access the target path to which the homomorphically encrypted data e(X) 1014 is uploaded and restricts access of third parties, and transmit the generated rule to a blockchain node 1020. Based on such a rule, the computing system 1010 may upload a plurality of data-to-be-analyzed for a specific user to a specific blockchain path (that is, the same path).

The computing system 1010 may determine so as to simultaneously or sequentially encrypt a plurality of privacy-preserving data that uses the same private key, and upload the plurality of homomorphically encrypted data to the same target path. In this case, the plurality of privacy-preserving data may be provided by applications/web services different from each other, and based on a request (e.g., a request to link using a private key), data provided by one application/web service may be collected by another application/web service and requested for analysis, homomorphically encrypted, and recorded.

For example, it is assumed that user A (e.g., a patient) received medical services from hospital A 10 years ago and now receives medical services from hospital B. User A can also access medical data provided by hospital A by accessing an application/web service (e.g., hospital B website) associated with hospital B from which the user A is currently receiving medical services, and signing in with a private key. Next, in response to the analysis request, the computing system 1010 may encrypt the medical data provided by hospital A, and additionally record (or, store) it in the target path of the blockchain in which homomorphically encrypted data matching hospital B is stored. As another example, the computing system 1010 may homomorphically encrypt the medical data provided by hospital B, and additionally record (or, store) it in the target path of the blockchain in which the previous homomorphically encrypted data matching the hospital A is stored. In this case, when the block state of the blockchain node 1020 is updated by a worker 1030 associated with the target path completing the analysis operation, additional analysis operations on other data present in the same target path may be sequentially executed.

As such, by recording (or storing) each privacy-preserving data provided by a plurality of applications/web services (e.g., hospital A website, hospital B website, healthcare service platform, and the like) in the same target path of the blockchain, it is possible to integrate the data cumulatively recorded in the corresponding target path, thereby enabling more accurate analysis.

The blockchain node 1020 reflects the homomorphically encrypted data e(X) 1014 in the block state, and requests an analysis operation to the worker 1030 associated with the target path in which the homomorphically encrypted data e(X) 1014 is stored. To this end, the block state listener included in the blockchain node 1020 or the computing system 1010 detects the change of the block state according to the upload of the homomorphically encrypted data e(X) 1014, generate an event (e.g., operation request) corresponding thereto, and transmit the same to the worker 1030 associated with the target path. The worker 1030 analyzes the homomorphically encrypted data e(X) 1014 without decrypting it according to the operation request included in the event, and generate a homomorphically encrypted analysis result H(e(X)) 1032, and store the same in the designated path of the blockchain node 1020. At this time, the block state listener included in the blockchain node 1020 or the computing system 1010 may detect the change of the block state according to the recording of the homomorphically encrypted analysis result H(e(X)) 1032, and transmit a corresponding event, that is, an operation completion notification to the computing system 1010.

Based on the request to check analysis result by the client (not illustrated), the computing system 1010 receives the homomorphically encrypted analysis result H(e(X)) 1032 recorded (stored) in the designated path, and decrypts the same using the encryption engine, and then provides the decrypted analysis result H(X) 1014 to the client.

Meanwhile, in FIG. 10, it is illustrated that no system is intervening between the blockchain node 1020 and the worker 1030, but embodiments are not limited thereto.

Alternatively, in an embodiment, the computing system of the present disclosure (or a blockchain-based serverless computing system included therein) may intervene between the blockchain node 1020 and the worker 1030 to perform an associated interaction operation. For example, the computing system of the present disclosure may transmit an event to the worker 1030, download homomorphically encrypted data requested from the worker 1030, and/or upload the analysis result requested from the worker 1030.

Figure 11:
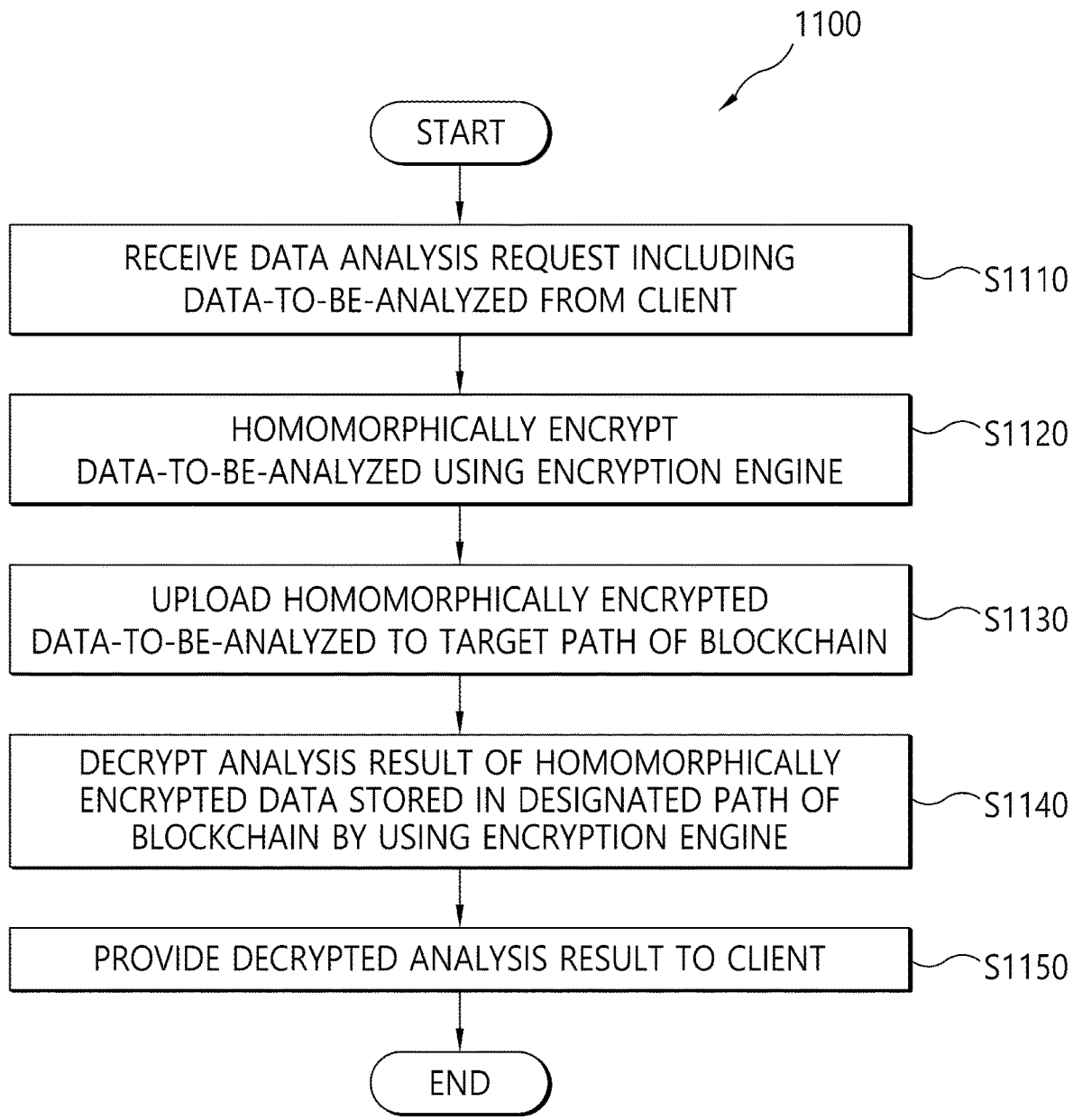
FIG. 11 is a flowchart illustrating a process of a computing method for privacy-preserving data analysis according to an embodiment.

FIG. 11 is a flowchart illustrating a process 1100 of a computing method for privacy-preserving data analysis according to an embodiment. Each process of the process 1100 of FIG. 11 may be performed by one or more processors of a computing system (configuration such as computing systems 720, 930, and 1010 according to the present disclosure, blockchain-based serverless computing system included therein, encryption engine, block state listener, and the like). Accordingly, it should be noted that in describing each process of the following process 1100, unless otherwise specified, each process is to be performed by a computing system (or processor of the computing system).

The process 1100 may be initiated by receiving a data analysis request including the data-to-be-analyzed from the client, at S1110. In an embodiment, the data analysis request may include identification information associated with the client, for example, user identification information (e.g., password, UID, verifiable credential (VC), and/or user biometric information, and the like) identified by a private key.

When the analysis request is received from the client, the computing system homomorphically encrypts the data-to-be-analyzed using the encryption engine, at S1120. In this case, the encryption engine may homomorphically encrypt the data-to-be-analyzed using a pre-stored algorithm such as homomorphic cipher algorithm, for example.

Next, by the computing system, the homomorphically encrypted data-to-be-analyzed is uploaded to the target path of the blockchain, at S1130. At this time, only the users using the private key may be allowed to access the target path of the blockchain, while access by third parties is restricted. When the homomorphically encrypted data-to-be-analyzed is uploaded to the target path of the blockchain, a request to operate is transmitted to a worker associated with the target path, and the worker performs analysis operation on the uploaded homomorphically encrypted data-to-be-analyzed without decrypting it. As a result, the homomorphically encrypted analysis result is stored in the designated path in association with the target path. When the homomorphically encrypted analysis result is stored as described above, an analysis operation completion notification may be transmitted to the computing system/client.

Next, the computing system decrypts the analysis result of the homomorphically encrypted data stored in the designated path using the encryption engine, at S1140. In an embodiment, decrypting the homomorphically encrypted analysis result may be performed in response to the request to check analysis result. The request to check analysis result may be generated by at least one of a response to the analysis operation completion notification, or access and user sign in to check the analysis result. When the analysis result of the homomorphically encrypted data is decrypted as described above, the computing system provides the decrypted analysis result to the client, at S1150.

Meanwhile, in the present disclosure, the data-to-be-analyzed for privacy-preserving data analysis has been described with reference to the healthcare-related data such as medical data and the like by way of an example, but to the extent that there is no conflict, the embodiments may be applied to privacy-preserving data in other fields such as, for example, privacy-preserving data provided in various fields such as electronic voting systems, personal query services of search engines, financial/banking services, and the like.

As described above, with the computing method for privacy-preserving data analysis according to the present disclosure, data requiring privacy protection is homomorphically encrypted to be uploaded, analyzed, and stored, so that concerns of data leakage can be eliminated in the entire process of transmitting data-to-be-analyzed, analyzing the same, and transmitting analysis results. Specifically, since it is not necessary for the worker on the blockchain network to decrypt the homomorphically encrypted data to perform analysis operation, the privacy guarantee can still be maintained during the data analysis process. Accordingly, both data usability and security aspects can be satisfied. In addition, since the analysis result of the data is also maintained in the homomorphically encrypted state, and the homomorphically encrypted analysis result is decrypted only when there is a user request, personal information can be safely processed and managed from the request for data analysis to the storage of analysis result, enabling a wide range of applications in various industries requiring high privacy preservation.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, embodiments are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A computing method for privacy-preserving data analysis, the method performed by at least one processor and comprising:
   receiving a data analysis request including data-to-be-analyzed from a client;
   homomorphically encrypting the data-to-be-analyzed by using an encryption engine;
   uploading the homomorphically encrypted data-to-be-analyzed to a target path of a blockchain;
   decrypting an analysis result of the homomorphically encrypted data stored in a designated path of the blockchain by using the encryption engine; and
   providing the decrypted analysis result to the client, wherein the analysis result of the homomorphically encrypted data is data analyzed by a worker linked to the blockchain, and stored in a designated path in association with the target path of the blockchain.

2. The computing method according to claim 1, wherein the data analysis request includes at least one of identification information associated with the client or information on an analysis target, and
   the target path of the blockchain is a path associated with at least one of the identification information or the information on the analysis target.

3. The computing method according to claim 1, further comprising, in response to the uploading the homomorphically encrypted data-to-be-analyzed to the target path of the blockchain, transmitting a request for analysis operation to the worker associated with the target path.

4. The computing method according to claim 1, further comprising, in response to the storing of the analysis result of the homomorphically encrypted data-to-be-analyzed being in the designated path of the blockchain, transmitting an analysis operation completion notification to the client.

5. The computing method according to claim 1, wherein the decrypting the analysis result of the homomorphically encrypted data stored in the designated path of the blockchain by using the encryption engine comprises:
   receiving a request to check analysis result from the client;
   receiving the analysis result of the homomorphically encrypted data stored in the designated path of the blockchain; and
   decrypting the analysis result of the homomorphically encrypted data by using the encryption engine, wherein the request to check analysis result includes identification information associated with the client, information on an analysis target, and information on at least one of the target path or the designated path.

6. The computing method according to claim 1, wherein the data-to-be-analyzed includes data extracted from a plurality of applications.

7. A computer program stored in a non-transitory computer-readable recording medium for executing, on a computer, the method according to claim 1.

8. A computing system for privacy-preserving data analysis, comprising:
   a communication module;
   a memory; and
   at least one processor connected to the memory and configured to execute one or more computer-readable programs included in the memory, wherein
   the at least one program further includes instructions for:
   receiving a data analysis request including data-to-be-analyzed from a client;
   homomorphically encrypting the data-to-be-analyzed using an encryption engine;
   uploading the homomorphically encrypted data-to-be-analyzed to a target path of a blockchain;
   decrypting an analysis result of the homomorphically encrypted data stored in a designated path of the blockchain by using the encryption engine; and
   providing decrypted analysis result to the client, wherein the analysis result of the homomorphically encrypted data is data analyzed by a worker linked to the blockchain, and stored in a designated path in association with the target path of the blockchain.

9. The computing system according to claim 8, wherein the data analysis request includes at least one of identification information associated with the client or information on an analysis target, and
   the target path of the blockchain is a path associated with at least one of the identification information or the information on the analysis target.

10. The computing system according to claim 8, wherein the at least one program further includes instructions for, in response to the uploading the homomorphically encrypted data-to-be-analyzed to the target path of the blockchain, transmitting a request for analysis operation to the worker associated with the target path.

\* \* \* \* \*